US012424771B2

(12) United States Patent
Lv

(10) Patent No.: US 12,424,771 B2
(45) Date of Patent: Sep. 23, 2025

(54) ANTENNA ASSEMBLY WITH DIELECTRIC ISOLATOR AND BASE STATION ANTENNA

(71) Applicant: Outdoor Wireless Networks LLC, Claremont, NC (US)

(72) Inventor: Fusheng Lv, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 213 days.

(21) Appl. No.: 18/259,484

(22) PCT Filed: Dec. 23, 2021

(86) PCT No.: PCT/US2021/065033

§ 371 (c)(1),
(2) Date: Jun. 27, 2023

(87) PCT Pub. No.: WO2022/146859

PCT Pub. Date: Jul. 7, 2022

(65) Prior Publication Data

US 2024/0063558 A1 Feb. 22, 2024

(30) Foreign Application Priority Data

Dec. 31, 2020 (CN) ......................... 202011617093.4

(51) Int. Cl.
*H01Q 1/24* (2006.01)
*H01P 1/36* (2006.01)
(Continued)

(52) U.S. Cl.
CPC ............. *H01Q 25/001* (2013.01); *H01P 1/36* (2013.01); *H01Q 1/246* (2013.01); *H01Q 1/523* (2013.01)

(58) Field of Classification Search
CPC .......... H01Q 1/246; H01Q 1/52; H01Q 1/521; H01Q 1/523; H01Q 21/24; H01Q 21/46
See application file for complete search history.

(56) References Cited

U.S. PATENT DOCUMENTS

| | | | | |
|---|---|---|---|---|
| 5,952,983 A * | 9/1999 | Dearnley | H01Q 1/523 343/810 |
| 6,069,590 A * | 5/2000 | Thompson, Jr. | H01Q 21/26 343/797 |

(Continued)

FOREIGN PATENT DOCUMENTS

| | | |
|---|---|---|
| CN | 207338626 U | 5/2018 |
| CN | 111555031 A | 8/2020 |
| JP | 2007201868 A | 8/2007 |

OTHER PUBLICATIONS

"Notification of Transmittal of the International Search Report and the Written Opinion of the International Searching Authority, or the Declaration for corresponding International Application No. PCT/US2021/065033, mailing date: Mar. 22, 2022, (45 pages)".

(Continued)

*Primary Examiner* — Jason M Crawford
(74) *Attorney, Agent, or Firm* — Myers Bigel, P.A.

(57) ABSTRACT

An antenna assembly, which includes one or more radiating element arrays and at least one dielectric isolator for the one or more radiating element arrays, wherein, the dielectric isolator is configured to tune the phase of a coupling signal between the radiating elements so as to at least partially eliminate coupling interference between the radiating elements. As a result, the radiation pattern of the antenna can be improved. The present disclosure also provides a base station antenna having the antenna assembly.

19 Claims, 7 Drawing Sheets

(51) Int. Cl.
*H01Q 1/52* (2006.01)
*H01Q 25/00* (2006.01)

(56) References Cited

U.S. PATENT DOCUMENTS

| | | | | |
|---|---|---|---|---|
| 6,608,600 | B2 * | 8/2003 | Eriksson | H01Q 21/24 343/810 |
| 10,916,842 | B2 * | 2/2021 | Ai | H01Q 19/10 |
| 12,218,425 | B2 * | 2/2025 | Varnoosfaderani | H01Q 1/24 |
| 2002/0101388 | A1 * | 8/2002 | Ippolito | H01Q 21/08 343/797 |
| 2003/0214452 | A1 * | 11/2003 | Ippolito | H01Q 1/523 343/797 |
| 2007/0046558 | A1 * | 3/2007 | Tillery | H01Q 1/246 343/797 |
| 2013/0050031 | A1 * | 2/2013 | Zhu | H01Q 1/2266 343/702 |
| 2013/0188328 | A1 * | 7/2013 | Hashemi-Yeganeh | H01P 11/002 361/818 |
| 2017/0264012 | A1 * | 9/2017 | Clark | H01Q 1/523 |
| 2019/0123443 | A1 * | 4/2019 | Russell | H01Q 1/22 |
| 2021/0119331 | A1 * | 4/2021 | Niakan | H01Q 1/2283 |
| 2021/0135371 | A1 * | 5/2021 | Zhang | H01Q 19/108 |
| 2021/0359406 | A1 * | 11/2021 | Yang | H01Q 21/06 |
| 2021/0391647 | A1 * | 12/2021 | Guo | H01Q 19/106 |
| 2023/0291122 | A1 * | 9/2023 | Xue | H01Q 21/24 |
| 2024/0063558 | A1 * | 2/2024 | Lv | H01P 1/36 |
| 2024/0213657 | A1 * | 6/2024 | Li | H01Q 21/24 |
| 2025/0030163 | A1 * | 1/2025 | West | H01Q 1/521 |
| 2025/0038426 | A1 * | 1/2025 | Lee | H01Q 1/24 |

OTHER PUBLICATIONS

Sipal Vit et al: "Advent of practical UWB localization: (R)Evolution in UWB antenna research", The 8th European Conference On Antennas and Propagation (EUCAP 2014), European Association On Antennas and Propagation, Apr. 6, 2014, pp. 1561-1565.

* cited by examiner

200

ANTENNA ASSEMBLY WITH DIELECTRIC ISOLATOR AND BASE STATION ANTENNA

CROSS-REFERENCE TO RELATED APPLICATIONS

The present application is a 35 U.S.C. § 371 national stage application of PCT Application No. PCT/US2021/065033, filed on Dec. 23, 2021, which claims the benefit of priority to Chinese Patent Application No. 202011617093.4, filed on Dec. 31, 2020, with the entire contents of the above-identified applications incorporated by reference as if set forth herein.

TECHNICAL FIELD

The present disclosure generally relates to radio communications, and more specifically, to an antenna assembly with a dielectric isolator for a cellular communication system, and a related base station antenna such as a beamforming antenna.

BACKGROUND

Base station antennas generally comprise a linear array or a two-dimensional array of radiating elements, such as crossed dipoles or patch radiating elements. In order to increase system capacity, beamforming base station antennas, which include a plurality of closely spaced linear arrays of radiating elements configured for beamforming, are currently being deployed. Many beamforming antennas are designed to use beamforming to narrow the beam width of the generated antenna beams in the azimuth plane. This increases the signal power transmitted in the desired user direction and reduces interference.

If the linear arrays of radiating elements in the beamforming antenna are closely spaced, the antenna beam can be scanned to a very wide angle in the azimuth plane without generating high (large magnitude) sidelobes. However, when the linear arrays are more closely spaced, the mutual coupling between the radiating elements in adjacent ones of the linear arrays increases, which reduces other performance parameters of the base station antenna, such as co-polarization performance. Therefore, the radiation pattern of the antenna may be distorted and the beam synthesis performance may be deteriorated. This is undesirable.

In order to improve the isolation performance, an isolator is arranged between radiating elements. Conventional isolators are usually implemented using sheet metal or PCB components with metal patterns. The metal surfaces on these isolators can at least partially reduce the coupling signals between adjacent radiating elements. However, these isolators may distort the radiation pattern of the antenna due to their metal surfaces. For example, these isolators can absorb radio waves emitted by corresponding radiating elements and re-radiate the radio waves with different phase. Therefore, these conventional isolators may negatively affect the radiation pattern of the antenna. This is also undesirable.

SUMMARY

Therefore, the objective of the present disclosure is to provide an antenna assembly with a dielectric isolator and a related base station antenna capable of overcoming at least one drawback in the prior art.

According to a first aspect of the present disclosure, an antenna assembly for a beamforming antenna is provided. The antenna assembly includes one or more radiating element arrays and at least one dielectric isolator for the one or more radiating element arrays, wherein the dielectric isolator is configured to tune the phase of a coupling signal between the radiating elements so as to at least partially eliminate coupling interference between the radiating elements.

In the present disclosure, the dielectric isolator should be understood as an isolator without a metal acting surface. Unlike a metal isolator, an RF signal is basically transmitted through the dielectric isolator without or with a lower degree of re-reflection or re-radiation on the surface of the isolator as in the metal isolator. The working principle of the dielectric isolator is that the wavelength of the RF signal changes as the dielectric constant of a propagation medium changes. On this basis, by changing the amount of phase change undergone by the RF signal transmitted through the isolator, it is possible to tune the phase of (at least) a part of the coupling signal between the radiating elements to at least partially eliminate the coupling interference between the radiating elements, thereby improving the isolation performance of the antenna while minimizing negative influence on the radiation pattern of the antenna.

According to a second aspect, an antenna assembly is provided. The antenna assembly includes a base plate, one or more radiating element arrays mounted on the base plate, and at least one dielectric isolator for the one or more radiating element arrays, wherein, the dielectric isolator is configured as a metal-free isolator, and the dielectric isolator is arranged between the radiating elements to at least partially reduce the coupling interference between the radiating elements.

The antenna assembly according to some embodiments of the present disclosure can improve the shape of the radiation pattern and/or improve the cross-polar discrimination of the antenna.

According to a third aspect, a base station antenna including the antenna assembly according to one of the embodiments of the present disclosure is provided. In some embodiments, the base station antenna may be configured as a beamforming antenna or a large-scale multi-input multi-output antenna.

According to a fourth aspect of the present disclosure, a method for tuning an antenna assembly through a dielectric isolator is provided. The antenna assembly includes one or more radiating element arrays and at least one dielectric isolator for the one or more radiating element arrays, and the method includes: selecting the thickness and/or dielectric constant of the dielectric isolator so that a first part of a coupling signal transmitted through the dielectric isolator cancels a second part of the coupling signal not transmitted through the dielectric isolator.

According to a fifth aspect of the present disclosure, a dielectric isolator is provided. The dielectric isolator is configured to reduce coupling interference between adjacent radiating elements by changing a phase of a first part of a coupling signal transmitted through the dielectric isolator, wherein the first part of the coupling signal transmitted through the dielectric isolator cancels a second part of the coupling signal not transmitted through the dielectric isolator.

DETAILED DESCRIPTION

Figure 1:
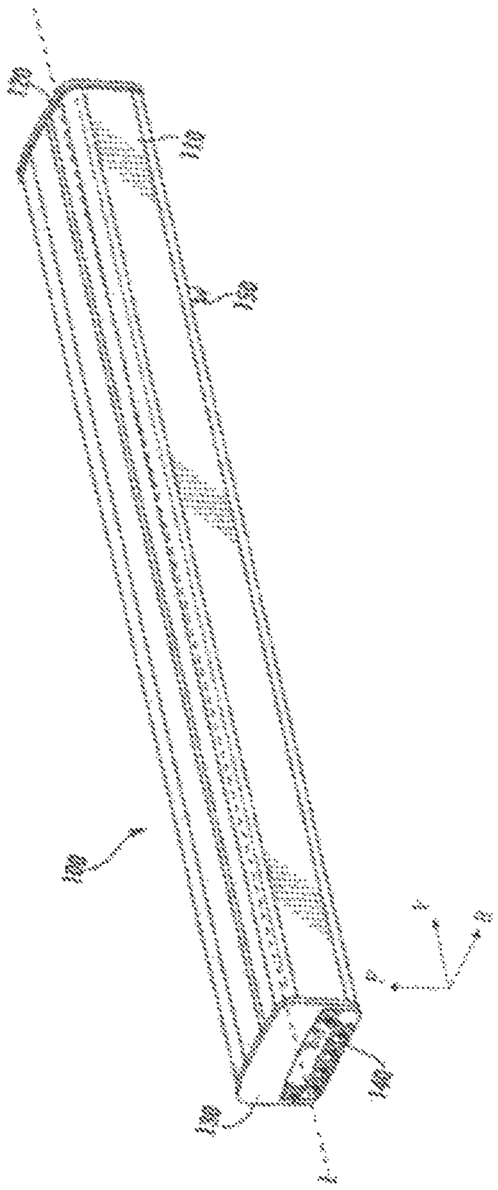
FIG. 1 is a schematic perspective view of a base station antenna according to some embodiments of the present disclosure.

The present disclosure will be described below with reference to the attached drawings, which show several embodiments of the present disclosure. However, it should be understood that the present disclosure can be presented in many different ways and is not limited to the embodiments described below. In fact, the embodiments described below are intended to make the present disclosure more complete and to fully explain the protection scope of the present disclosure to those skilled in the art. It should also be understood that the embodiments disclosed in the present disclosure may be combined in various ways so as to provide more additional embodiments.

It should be understood that in all the attached drawings, the same symbols denote the same elements. In the attached drawings, the dimensions of certain features can be changed for clarity.

It should be understood that the words in the specification are only used to describe specific embodiments and are not intended to limit the present disclosure. Unless otherwise defined, all terms (including technical terms and scientific terms) used in the Specification have the meanings commonly understood by those of ordinary skill in the art. For brevity and/or clarity, well-known functions or structures may not be further described in detail.

The singular forms "a," "an," "the" and "this" used in the Specification all include plural forms unless clearly indicated. The words "include," "contain" and "have" used in the Specification indicate the presence of the claimed features, but do not exclude the presence of one or more other features. The word "and/or" used in the Specification includes any or all combinations of one or a plurality of the related listed items. The words "between X and Y" and "between approximate X and Y" used in the Specification shall be interpreted as including X and Y. As used herein, the wording "between about X and Y" means "between approximate X and approximate Y," and as used herein, the wording "from approximate X to Y" means "from approximate X to approximate Y".

In the specification, when an element is referred to as being "on," "attached" to, "connected" to, "coupled" with, "contacting," etc., another element, it can be directly on, attached to, connected to, coupled with or contacting another element or an intermediate element may also be present. In contrast, if an element is described "directly" "on" another element, "directly attached" to another element, "directly connected" to another element, "directly coupled" to another element or "directly contacting" another element, there will be no intermediate elements. In the specification, a feature that is arranged "adjacent" to another feature, may denote that a feature has a part that overlaps an adjacent feature or a part located above or below the adjacent feature.

In the Specification, words expressing spatial relations such as "upper," "lower," "left," "right," "front," "rear," "top," and "bottom" may describe the relation between one feature and another feature in the attached drawings. It should be understood that, in addition to the locations shown in the attached drawings, the words expressing spatial relations further include different locations of a device in use or operation. For example, when a device in the attached drawings rotates reversely, the features originally described as being "below" other features now can be described as being "above" the other features. The device may also be oriented by other means (rotated by 90 degrees or at other locations), and next, a relative spatial relation will be explained accordingly.

Embodiments of the present disclosure are now described in more detail with reference to the attached drawings.

Figure 2:
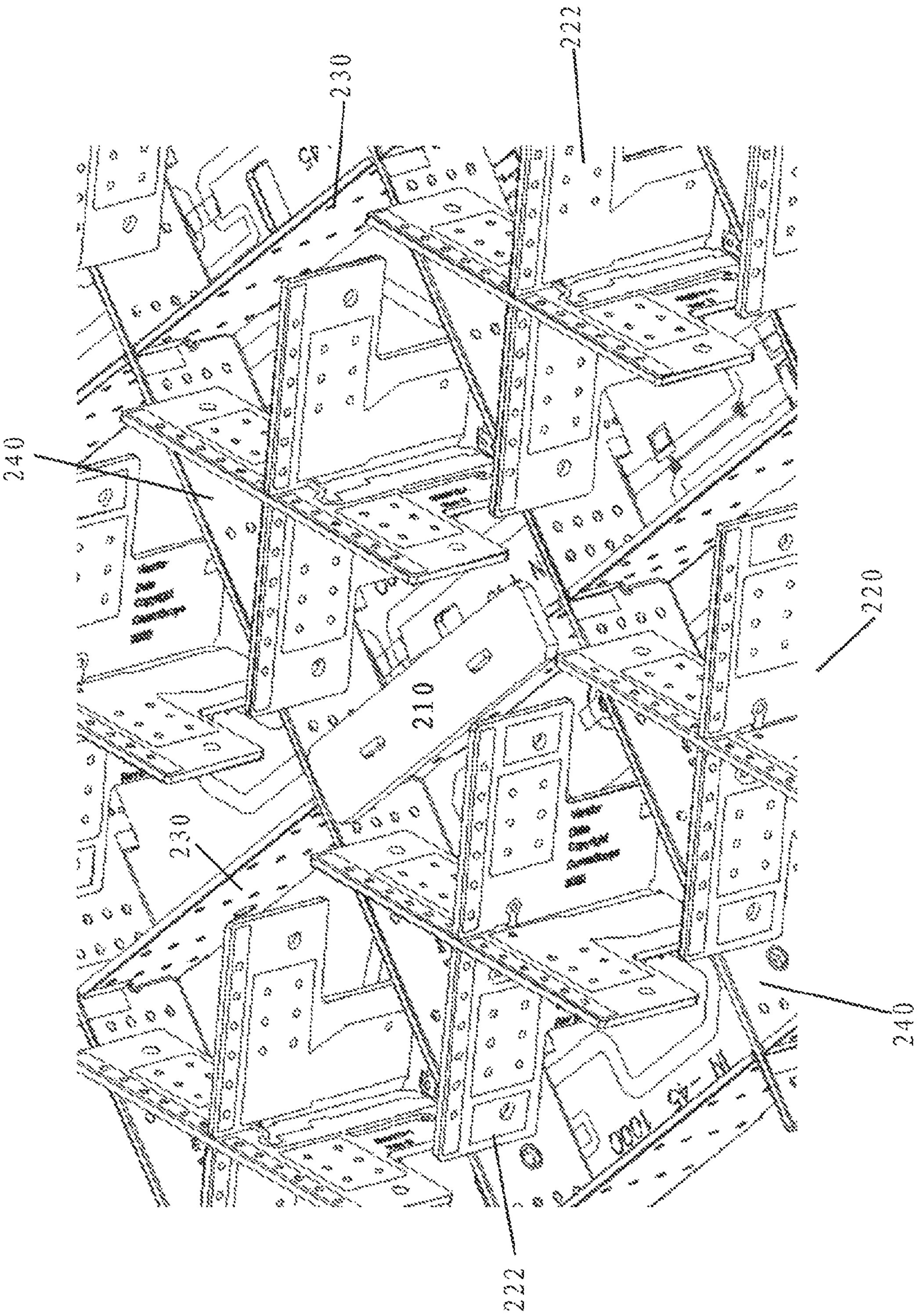
FIG. 2 is a partial perspective view of an antenna assembly in the base station antenna of FIG. 1.

Referring to FIGS. 1 and 2, FIG. 1 is a schematic perspective view of a base station antenna according to some embodiments of the present disclosure, and FIG. 2 is a partial perspective view of an antenna assembly in the base station antenna of FIG. 1.

As shown in FIG. 1, the base station antenna 100 is an elongated structure that extends along a longitudinal axis L. The base station antenna 100 may have a tubular shape with a generally rectangular cross-section. The base station antenna 100 includes a radome 110 and a top end cap 120. In some embodiments, the radome 110 and the top end cap 120 may comprise a single integral unit, which may be helpful for waterproofing. One or more mounting brackets 150 are provided on the rear side of the radome 110 which may be used to install the base station antenna 100 onto an antenna mount (not shown) on, for example, an antenna tower. The base station antenna 100 also includes a bottom end cap 130, and the bottom end cap 130 includes a plurality of connectors 140 mounted therein. The base station antenna 100 is typically mounted in a vertical configuration (i.e., the longitudinal axis L may be generally perpendicular to a plane defined by the horizon when the base station antenna 100 is mounted for normal operation). The techniques according to embodiments of the present invention that are disclosed herein may be applied to a wide variety of different types of base station antennas such as, for example, multi-band antennas, beamforming antennas, large-scale multi-input multi-output (MIMO) antennas and the like.

As shown in FIG. 2, the base station antenna 100 includes an antenna assembly 200, and the antenna assembly 200 may be slidably inserted into the radome 110 from the top or bottom before the top end cap 120 or the bottom end cap 130 is attached to the radome 110. The antenna assembly 200 may include a base plate (such as a reflector) and a plurality of arrays 220 of radiating elements 222 mounted to extend forwardly from the base plate. Each array 220 may comprise a column of radiating elements 222 so that together the arrays 220 form a two-dimensional arrangement of radiating elements 222 that are disposed in rows and columns. Each radiating element array 220 may extend from the bottom end portion 130 to the top end portion 120 of the base station antenna 100 in a vertical direction V, which may be the direction of the longitudinal axis L of the base station antenna 100. The vertical direction V may be perpendicular to a horizontal direction H and a forward direction F (see FIG. 1). In other embodiments, the radiating elements 222 in adjacent arrays (columns) 220, may be offset in the vertical direction V so that each column is staggered with respect to adjacent columns.

It should be understood that the radiating elements 222 may be any type of radiating element and may be configured to operate in any operating frequency band. In some embodiments, the radiating elements 222 may be high-band radiating elements, the operating frequency band may be, for example, 3 GHz to 6 GHz or one or more partial ranges thereof. In other embodiments, the operating frequency band of the radiating elements 222 may be a millimeter wave communication frequency band (for example, a frequency band of tens of GHz). In still other embodiments, the radiating elements 222 may be mid-band radiating elements, and the operating frequency band may be, for example, 1427 MHz to 2690 MHz or one or more partial ranges thereof. In further embodiments, the radiating elements 222 may be low-band radiating elements, and the operating frequency band may be, for example, 617 MHz to 960 MHz or one or more partial ranges thereof.

Continuing to refer to FIG. 2, it can be seen that an isolator 210 is arranged between two adjacent radiating elements 222 to reduce the coupling interference between the radiating elements 222, thereby improving the isolation between the arrays 220. According to various embodiments of the present disclosure, the isolator 210 is a dielectric isolator, rather than a conventional isolator with a metal acting surface. In some embodiments, the dielectric isolator 210 may be a pure plastic member. In some embodiments, the dielectric isolator 210 may be made of a pure PCB base (substrate) material, that is, a PCB base material without a metal coating layer. In this way, the dielectric isolator can be manufactured in a cost-effective manner. A conventional metal isolator can interact with the radiating elements due to its metal acting surface and in some cases may cause distortion of the radiation pattern of the antenna. This negative effect of the metal isolator tends to increase as the distance between adjacent radiating elements 222 becomes smaller. In some cases, it may not even be possible to install metal isolators between adjacent radiating elements.

The dielectric isolator 210 may not include any metal acting surface. Therefore, the dielectric isolator 210 does not have, or has a lower degree of the aforementioned negative effect that the metal isolator has. A metal isolator tends to either reflect or capture and re-radiate RF signals. In contrast, RF signals tend to pass through the dielectric isolators according to embodiments of the present invention without, or only with a lower degree of, reflection or re-radiation. In the present disclosure, the working principle of the dielectric isolator 210 is that the speed at which an RF signal passes through the dielectric isolator is a function of the dielectric constant of the dielectric isolator 210. The speed of propagation of the RF signal effects how much the phase of the RF signal changes as it passes through the dielectric isolator 210. Thus, the amount that the phase of the portion of the RF signal that passes through the dielectric isolator 210 changes may be adjusted by varying the thickness and/or dielectric constant of the dielectric isolator 210. By adjusting the amount of phase change that the RF signal undergoes as it is transmitted through the dielectric isolator 210, it is possible to tune the phase of (at least) a part of the coupling signal between the radiating elements to at least partially eliminate the coupling interference between the radiating elements. Specifically, the dielectric isolator 210 may be arranged in a propagation path of a first part of the coupling signal, and the first part of the coupling signal may thus be transmitted through the dielectric isolator to undergo a phase change, such as a phase lag. The second part of the coupling signal is not transmitted through the dielectric isolator, and thus it does not undergo additional phase changes caused by the dielectric isolator. If the first part of the coupling signal and the second part of the coupling signal have phases so that they destructively combine, the coupling interference between the radiating elements can be effectively reduced, thereby improving the isolation performance of the antenna.

In some embodiments of the present disclosure, partitions 230 and 240 may be provided around each radiating element 222. These partitions can make the electromagnetic distribution around the radiating elements more symmetrical and uniform, thereby improving the radiation pattern of the antenna, for example, making the cross-polarization of the radiation pattern purer. As shown in FIG. 2, the antenna assembly 200 may include a plurality of first partitions 230 extending in the vertical direction V. The first partitions 230 are respectively arranged on both sides (in the horizontal direction) of each radiating element 222 in each of the radiating element arrays 220. The antenna assembly 200 may include a plurality of second partitions 240 extending in the horizontal direction H. The second partitions 240 are respectively arranged on both sides (in the vertical direction) of each radiating element 222 in the radiating element arrays 220. The first partition 230 and/or the second partition 240 may be configured as PCB partitions printed with metal patterns. In other embodiments, the first partition 230 and/or the second partition 240 may also be configured as metal partitions, such as copper partitions or aluminum partitions. It should be understood that the arrangement of the first partitions 230 and the second partitions 240 shown in FIG. 2 is only an exemplary embodiment, and the number and arrangement of the partitions 230, 240 can also be changed according to actual needs. In some embodiments, the antenna assembly 200 may also have only the first partitions 230 or the second partitions 240.

According to some embodiments of the present disclosure, the dielectric isolator 210 may be installed between the radiating elements 222 in any manner. For example, the dielectric isolator 210 may be mounted on one of the partitions 230, 240, mounted using a separate supporting mechanism, or directly mounted on the reflector in an appropriate manner such as through rivets, welding, and the like.

Figure 3:
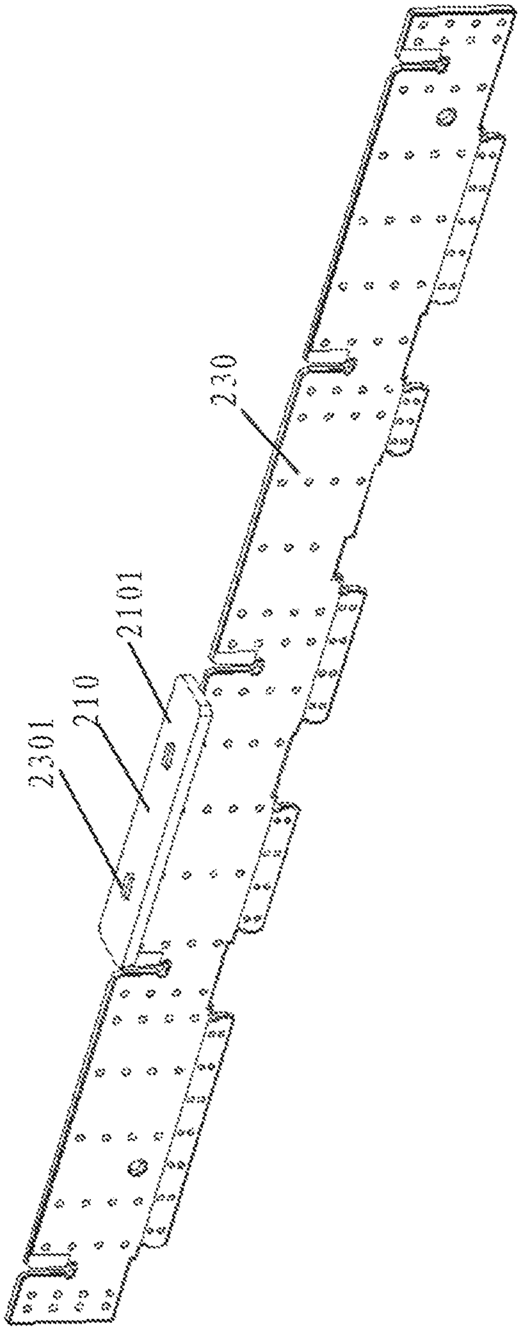
FIG. 3 is an exemplary view of an assembly formed by a dielectric isolator and a partition of the antenna assembly of FIG. 2.

Referring to FIG. 3, which is an exemplary view of an assembly formed by the dielectric isolator 210 and the partitions 230 (and could alternatively be formed by the dielectric isolator 210 and the partitions 240), wherein it shows a feasible mounting scheme of the dielectric isolator 210, that is, the dielectric isolator 210 is directly mounted on the partitions 230 (or 240), thereby forming an assembly of the dielectric isolator 210 and the partitions 230 (or 240).

With reference to FIGS. 2 and 3, the dielectric isolator 210 may be mounted on the first partition 230 so that the dielectric isolator 210 can be located between the radiating elements 222 of adjacent arrays (columns) 220, thereby reducing the coupling interference of the radiating elements 222 between adjacent arrays 220. The first partition 230 may be mounted on the reflector, and may have a mating portion 2301, for example, a protruding portion, on an end of the first partition 230 facing away from the reflector. The dielectric isolator 210 may have a corresponding mating portion 2101, for example, a groove, corresponding to the mating portion. As a result, the dielectric isolator 210 can be mounted on the mating portion 2301 of the first partition 230 through the corresponding mating portion 2101. In the depicted embodiment, the dielectric isolator 210 may be snugly mounted on the first partition 230 through the groove shape or may be secured by additional means such as welding. In other embodiments, the dielectric isolator 210 may also be bonded to the first partition 230.

Similarly, the dielectric isolator 210 may also be mounted on the second partition 240 so that the dielectric isolator 210 can be located between two radiating elements 222 in the same array 220, thereby reducing the coupling interference between the radiating elements 222 in the same array 220. Details are not described herein again.

In the embodiments of FIGS. 2 and 3, the dielectric isolator 210 may be configured as a rectangular parallelepiped dielectric block. It should be understood that the dielectric isolator 210 can have any suitable shape and structure, and is not limited to a specific embodiment. In other embodiments, the dielectric isolator 210 may also be configured in a cylindrical shape, a prismatic shape, a sheet shape, or a needle shape, etc.

In addition, the installation position and/or quantity of the dielectric isolator 210 can also be appropriately selected according to factors such as performance requirements, cost requirements, and/or installation conditions. Generally, in actual tuning, it is possible to observe isolation data displayed by a network analyzer in real time to select an optimal installation position. At these optimized installation positions, each coupling signal can have a cancellation effect due to the corresponding phase difference to at least partially eliminate the coupling interference between the radiating elements 222.

FIGS. 4 to 7 exemplarily show different simplified schematic views of the antenna assembly 200 according to some embodiments of the present disclosure.

Figure 4:
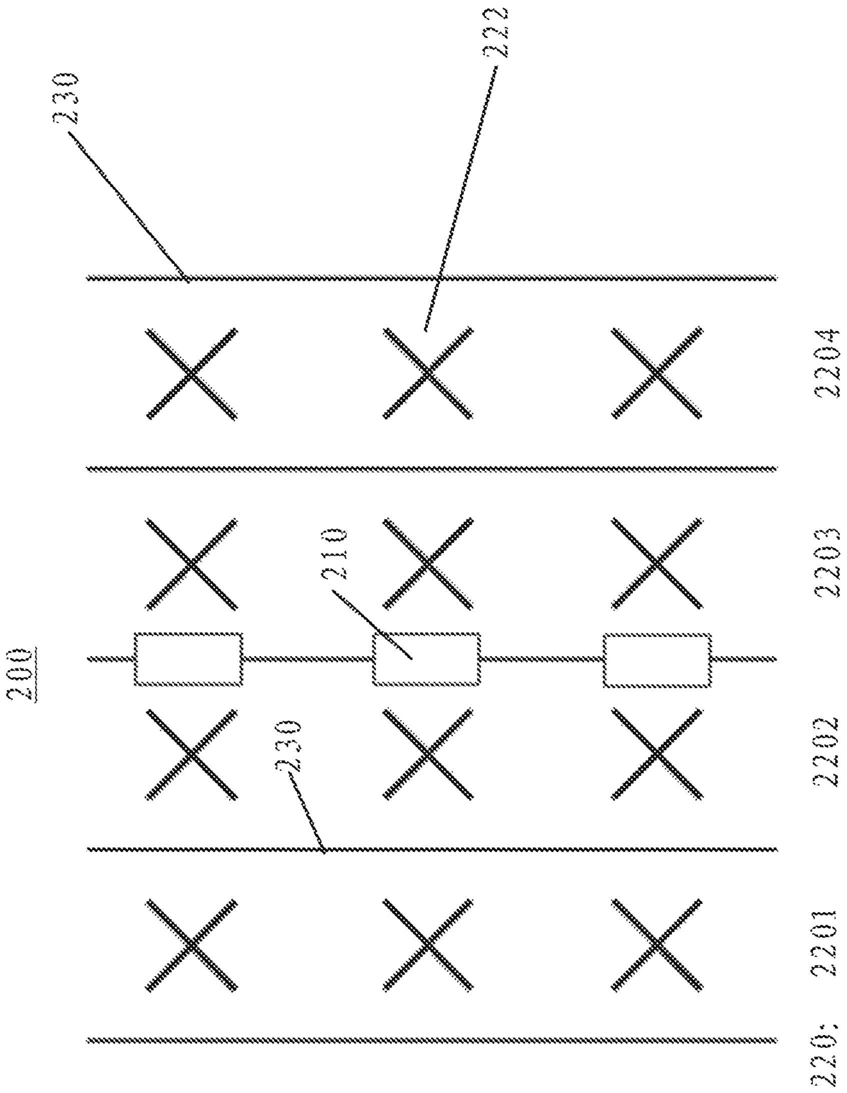
FIG. 4 is a first simplified schematic view of an antenna assembly according to some embodiments of the present disclosure.

FIG. 4 is a first simplified schematic view of the antenna assembly 200 according to some embodiments of the present disclosure. FIG. 4 only exemplarily shows four linear arrays of radiating elements: a plurality of first radiating elements 222 (three in this example), arranged as a first array 2201 extending vertically; a plurality of second radiating elements 222, arranged as a second array 2202 extending vertically; a plurality of third radiating elements 222, arranged as a third array 2203 extending vertically; and a plurality of fourth radiating elements 222, arranged as a fourth array 2204 extending vertically. These four arrays are arranged adjacent to each other in the horizontal direction H. In addition, the first partitions 230 extending in the vertical direction V are respectively arranged on both sides of each array.

The intensity of the coupling interference received by a radiating element 222 differs depending on its position on the front surface of the reflector. Generally, for example, in an antenna array composed of four linear arrays 220 (as shown in FIG. 4), the radiating elements 222 in a central region may receive more coupling interference from the surrounding radiating elements 222 than radiating elements 222 that are on the outer region or "periphery" of the combined two-dimensional array formed by the linear arrays. Additionally, the radiating elements 222 in the center of each linear array are often configured to transmit more RF energy than radiating elements 222 that are closer to either end of each linear array. Therefore, due to the influence of factors such as cost requirements and/or installation conditions, dielectric isolators 210 may only be provided for the radiating elements 222 that are in the central region of the combined two-dimensional array as these radiating elements 222 transmit more RF energy and are subject to increased coupling interference due to the fact that they are adjacent a greater number of other radiating elements 222. In the embodiment of FIG. 4, dielectric isolators 210 are only provided in the central area (for example, installed on the first partition 230 in the central region by the aforementioned installation methods), so that the coupling interference between the radiating elements of the second array 2202 and the third array 2203 in the central region is suppressed.

Figure 5:
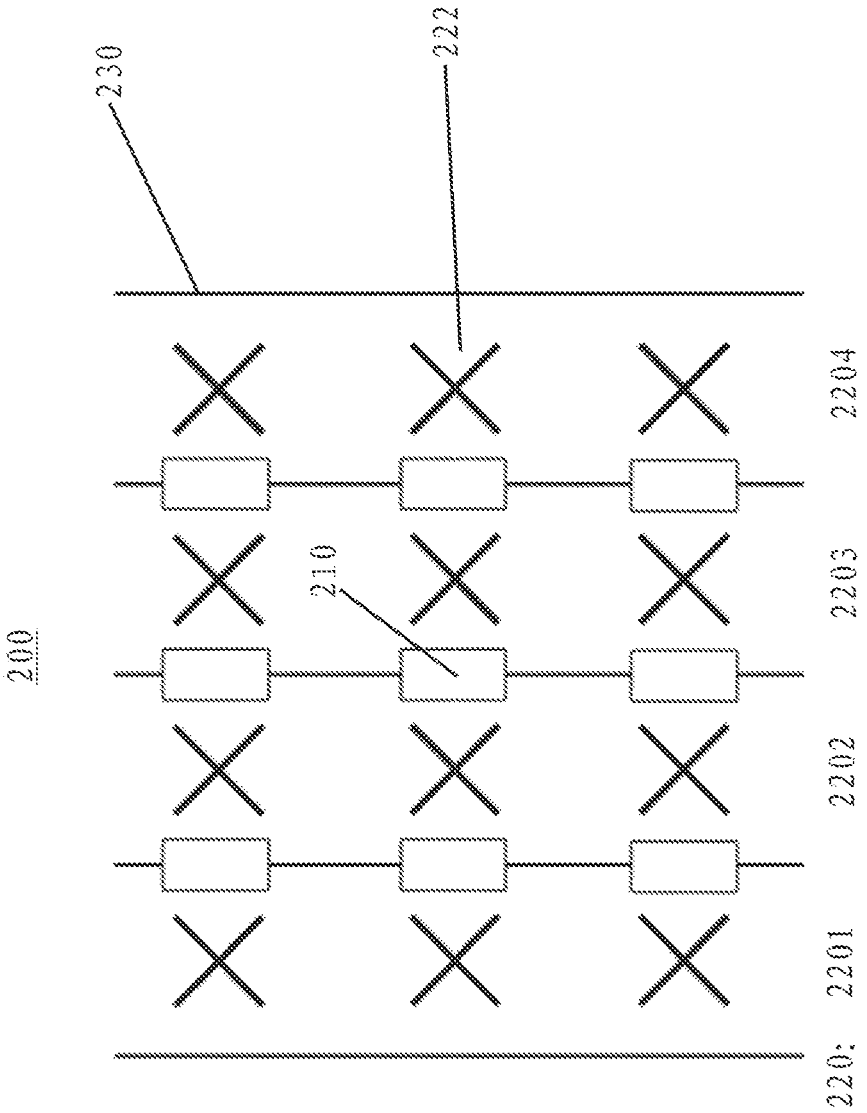
FIG. 5 is a second simplified schematic view of an antenna assembly according to some embodiments of the present disclosure.

FIG. 5 is a second simplified schematic view of an antenna assembly according to some embodiments of the present disclosure. In the embodiment of FIG. 5, a dielectric isolator 210 is provided between each of the arrays 2201 to 2204.

Figure 6:
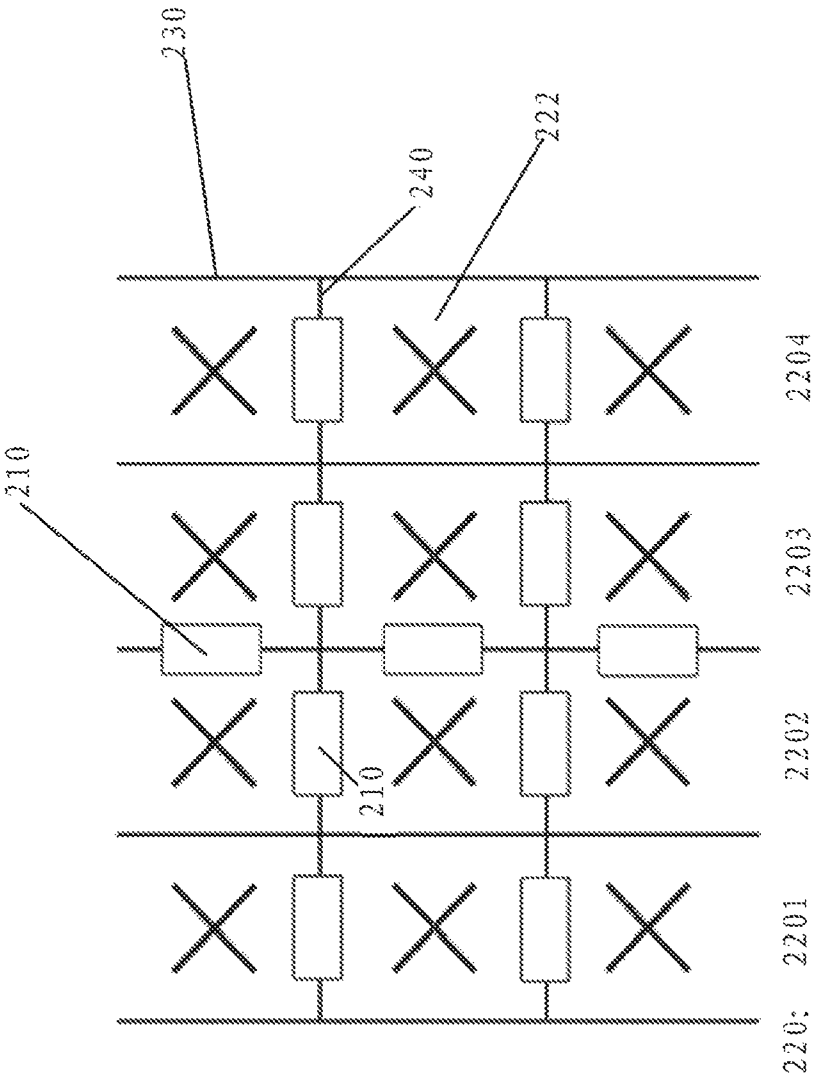
FIG. 6 is a third simplified schematic view of an antenna assembly according to some embodiments of the present disclosure.

FIG. 6 is a third simplified schematic view of the antenna assembly 200 according to some embodiments of the present disclosure. In the embodiment of FIG. 6, in addition to the first partition 230, the antenna assembly 200 further includes a plurality of second partitions 240 extending in the horizontal direction H. Therefore, the dielectric isolator 210 may also be mounted on the second partition 240 so that the dielectric isolator 210 can be located between two radiating elements 222 of the same array, thereby reducing the coupling interference between the radiating elements 222 of the same array.

Figure 7:
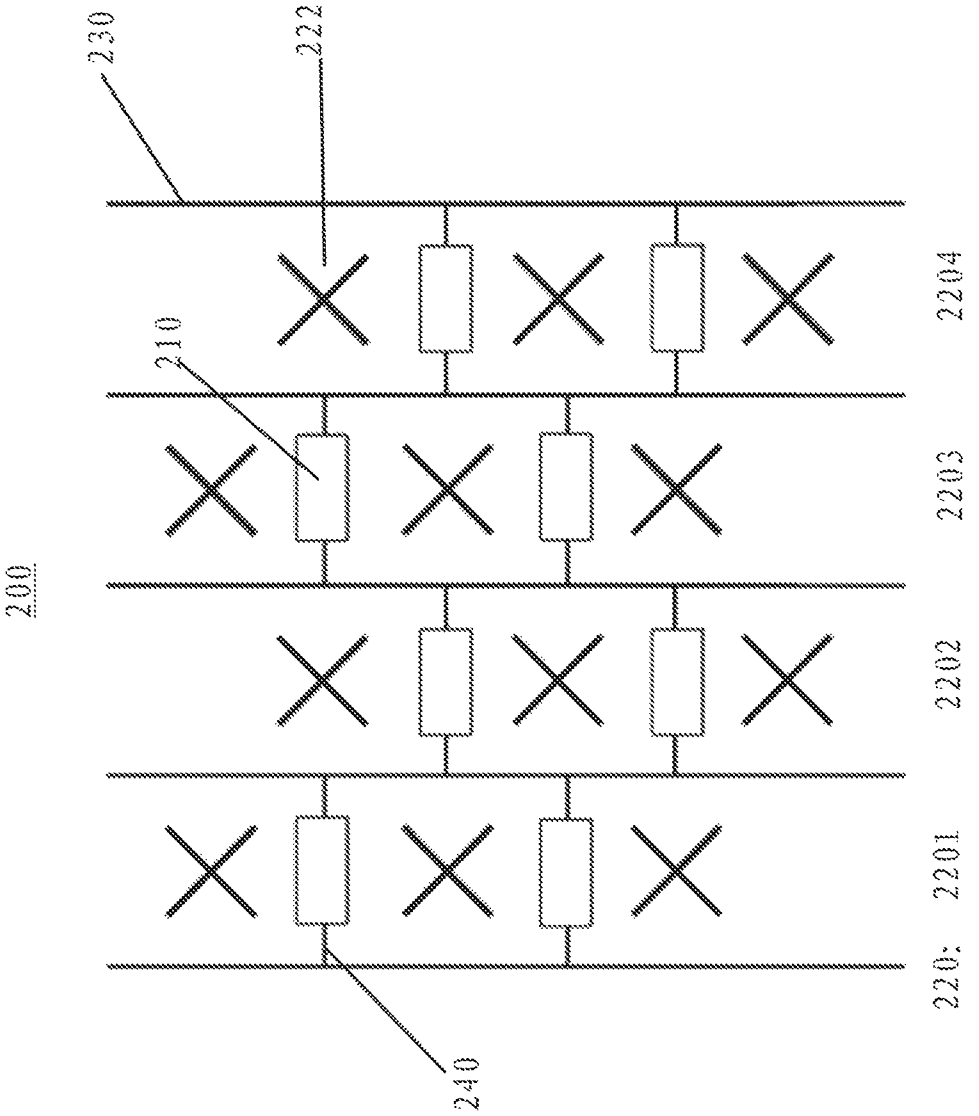
FIG. 7 is a fourth simplified schematic view of an antenna assembly according to some embodiments of the present disclosure.

FIG. 7 is a fourth simplified schematic view of an antenna assembly according to some embodiments of the present disclosure. Adjacent arrays in the arrays 2201 to 2204 are staggered in the vertical direction V, that is, they are no longer horizontally aligned. In this way, the spatial distance between the radiators of the same polarization of adjacent radiating elements 222 is increased so as to improve the isolation between adjacent arrays. In addition, FIG. 7 further shows the dielectric isolator 210 mounted on the second partition 240. These dielectric isolators 210 can effectively reduce the coupling interference between the radiating elements 222 in the same array. Of course, the dielectric isolators 210 may also be separately arranged around the radiating elements 222 without the aid of partitions.

Although exemplary embodiments of the present disclosure have been described, those skilled in the art should understand that many variations and modifications are possible in the exemplary embodiments without materially departing from the spirit and scope of the present disclosure. Therefore, all variations and changes are included in the protection scope of the present disclosure defined by the claims. The present disclosure is defined by the attached claims, and equivalents of these claims are also included.

What is claimed is:

1. An antenna assembly, comprising:

one or more radiating element arrays each comprising dual-polarized radiating elements, the dual-polarized radiating elements including a first dual-polarized radiating element and a second dual-polarized radiating element; and at least one dielectric isolator between the first and second dual-polarized radiating elements, wherein the dielectric isolator is configured to tune a phase of a coupling signal between the first and second dual-polarized radiating elements so as to at least partially eliminate coupling interference between the first and the second dual-polarized radiating elements.

2. The antenna assembly according to claim 1, wherein, the dielectric isolator is arranged in a transmission path of a coupling signal between the first dual-polarized radiating element and the second dual-polarized radiating element to tune a phase change amount of the coupling signal transmitted from the first dual-polarized radiating element to the second dual-polarized radiating element.

3. The antenna assembly according to claim 1, wherein, the dielectric isolator is configured such that a first part of the coupling signal transmitted through the dielectric isolator and a second part of the coupling signal not transmitted through the dielectric isolator have a cancellation effect.

4. The antenna assembly according to claim 1, wherein, the dielectric isolator is a plastic member.

5. An antenna assembly, wherein, the antenna assembly includes a base plate, one or more radiating element arrays mounted on the base plate, and at least one dielectric isolator for the one or more radiating element arrays, the dielectric isolator is configured as a metal-free isolator, and the dielectric isolator is arranged between the radiating elements to at least partially reduce coupling interference between the radiating elements.

6. The antenna assembly according to claim 5, wherein, the one or more radiating element arrays includes a first array extending vertically and an adjacent second array extending vertically, and at least one dielectric isolator is arranged between the first array and the second array.

7. The antenna assembly according to claim 6, wherein, the antenna assembly includes a first partition for the one or more radiating element arrays, and the first partition is arranged between the first array and the second array.

8. The antenna assembly according to claim 7, wherein, at least one dielectric isolator is mounted on the first partition.

9. The antenna assembly according to claim 8, wherein, the first partition is mounted on the base plate and has a mating portion on an end of the first partition facing away from the base plate, the at least one dielectric isolator has a corresponding mating portion corresponding to the mating portion, and the at least one dielectric isolator is mounted on the mating portion of the first partition through the corresponding mating portion.

10. The antenna assembly according to claim 7, wherein, the one or more radiating element arrays includes a first array extending vertically, and at least one dielectric isolator is arranged between adjacent radiating elements of the first array.

11. The antenna assembly according to claim 10, wherein, the antenna assembly includes a second partition for the one or more radiating element arrays, and the second partition is arranged between adjacent radiating elements of the first array.

12. The antenna assembly according to claim 11, wherein, at least one dielectric isolator is mounted on the second partition.

13. The antenna assembly according to claim 11, wherein, the second partition is mounted on the base plate and has a mating portion on an end of the second partition facing away from the base plate, the at least one dielectric isolator has a corresponding mating portion corresponding to the mating portion, and the at least one dielectric isolator is mounted on the mating portion of the first partition through the corresponding mating portion.

14. The antenna assembly according to claim 5, wherein, the one or more radiating element arrays includes a first radiating element allocated with a first share of radio frequency power and a second radiating element allocated with a second share of radio frequency power, the first share of radio frequency power is greater than the second share of radio frequency power, wherein at least one dielectric isolator is arranged adjacent to the first radiating element, and no dielectric isolator is arranged adjacent to the second radiating element.

15. The antenna assembly according to claim 14, wherein, the first radiating element is in a central region of the one or more radiating element arrays, and the second radiating element is in an edge area of the one or more radiating element arrays.

16. The antenna assembly according to claim 5, wherein, the dielectric isolator is configured as a pure plastic member.

17. The antenna assembly according to claim 5, wherein, the dielectric isolator is made of a pure PCB base material.

18. The antenna assembly according to claim 5, wherein, the base plate is a reflector.

19. A dielectric isolator, wherein: the dielectric isolator is configured to reduce coupling interference between adjacent radiating elements by changing a phase of a first part of a coupling signal transmitted through the dielectric isolator, wherein the first part of the coupling signal transmitted through the dielectric isolator cancels a second part of the coupling signal not transmitted through the dielectric isolator.

* * * * *